Sept. 15, 1970     L. D. STEVENS     3,528,866

METHOD OF MAKING LAMINATED PADDED ARTICLE

Filed Jan. 9, 1967

INVENTOR
LOREN D. STEVENS

BY
ATTORNEYS

United States Patent Office 3,528,866
Patented Sept. 15, 1970

3,528,866
METHOD OF MAKING LAMINATED PADDED ARTICLE

Loren D. Stevens, Columbus, Ind., assignor to Arvin Industries, Inc., Columbus, Ind., a corporation of Indiana
Filed Jan. 9, 1967, Ser. No. 608,028
Int. Cl. B32b 5/18; C09j 5/00
U.S. Cl. 156—220                                   4 Claims

ABSTRACT OF THE DISCLOSURE

A laminated padded article and method of making it in which there is a rigid panel having a first flexible sheet bonded thereto. A foam elastomer pad is interposed between said first sheet and a second flexible sheet with portions of said pad being compressed and said first and second sheets being fused together through said compressed pad portions.

BACKGROUND OF THE INVENTION

Laminated padded articles have been described in Wintermute et al. U.S. Pat. No. 3,012,926 in which a foam elastomer pad is laminated between a rigid panel and a sheet of flexible material. However, in such articles it is necessary to precut the pad to precise dimensions before lamination and to employ a pad having a cross-sectional extent less than the flexible sheet and panel.

The instant invention obviates the necessity for precutting the pad to a precise dimension and permits the use of different colored or designed sheets on the cushioned surface of the article.

SUMMARY OF THE INVENTION

In making a laminated padded article according to the preferred form of my invention, an open cell elastomeric pad is interposed between and bonded to a pair of sheets of thermoplastic material. Said sheets with the pads interposed therebetween are placed on a rigid panel and the bottom one of said sheets is bonded to said panel to form a padded laminate. Compression forces are applied to selected portions of the top sheet and pad to force said top sheet toward the bottom sheet. Said selected portions are heated simultaneously with the application of the compression forces to cause said sheets to melt within the extent of said portions and fuse together through the compressed pad. After such fusing, the panel is rigidly bonded to the bottom sheet, which in turn is rigidly fused to the top sheet within the extent of said selected portions. Outside the extent of said seleectd portions, the pad provides a cushioning layer between said sheets, and, because of its bonding to said sheets, provides a bond of lesser strength interconnecting said sheets.

BRIEF DESCRIPTION OF THE DRAWING

The accompanying drawing illustrates the invention. In such drawing.

DESCRIPTION OF THE PREFERRED EMBODIMENTS

Figure 1:
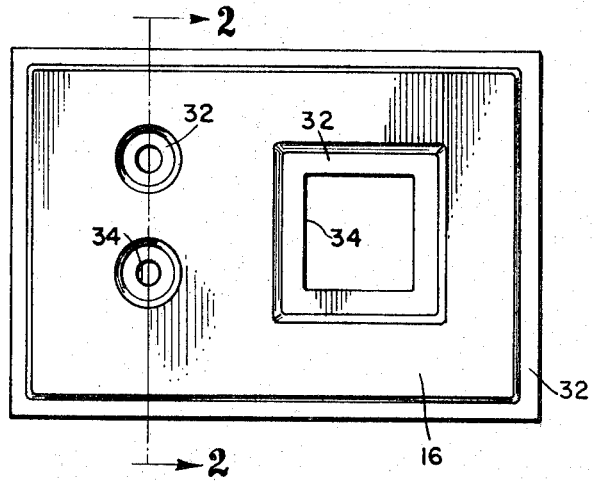
FIG. 1 is a front elevation of a cabinet panel embodying the invention.
Figure 2:
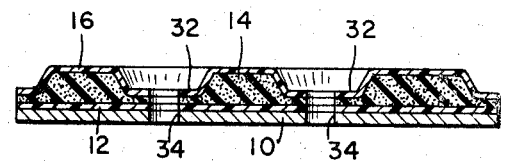
FIG. 2 is an enlarged vertical section taken on the line 2—2 of FIG. 1.

The cabinet panel shown in FIGS. 1 and 2 merely illustrates one type of article embodying the invention. In such embodiment, a metal panel 10, which forms the basic structural member of the finished article, has a flexible plastic sheet 12 adhesively bonded thereto. A foam elastomer pad 14 is bonded to the sheet 12 and to a covering sheet 16 of flexible plastic material. In the illustrated embodiment, pad 14 and sheets 12 and 16 have the same cross-sectional extents, but in some applications, it may be desirable for pad 14 and sheets 16 to have smaller cross-sectional extents than sheet 12. It may be desirable to employ sheets having different colors or textures when a sheet 16 is used having a smaller cross-sectional extent than sheet 12 to thus give the finished article a contrasting decorative appearance.

Figure 3:
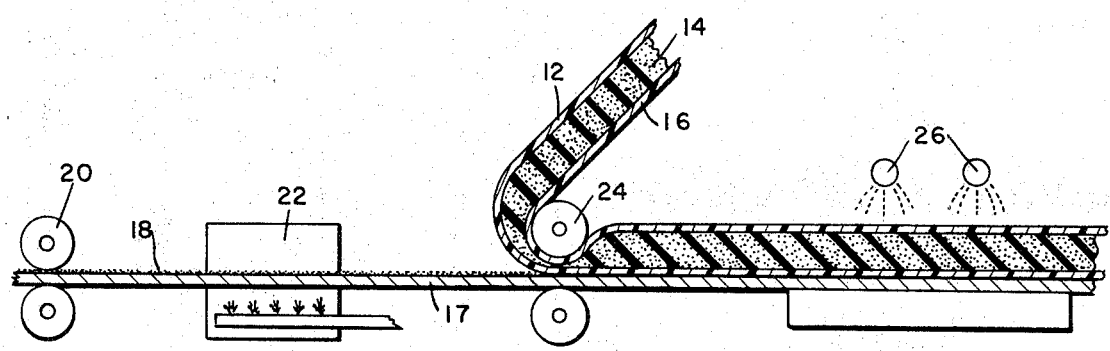
FIG. 3 is a showing of a laminating process embodying the invention.

In forming laminated padded articles in quantity production, it is convenient to laminate continuous strips of the metal and the plastic sheets with the pad interposed between said sheets, so that by cutting the continuous laminated structure, a plurality of laminated articles can be formed. Such an operation is shown in FIG. 3, wherein the upper face of a metal strip 17 is coated with an adhesive 18 by passing said strip between a pair of coating rollers 20. Desirably, said adhesive is a combination thermoplastic and thermosetting synthetic resin rubber based adhesive, such as adhesive No. J–1177 sold by the Armstrong Cork Company. After the adhesive is applied to the metal strip, it is passed through an oven 22 which heats the strip and adhesive to a temperature sufficient to soften and condition the adhesive for bonding the sheet 12 thereto, the temperature to which the adhesive is heated being a function of the particular adhesive employed.

Sheets 12 and 14 are formed from a thermoplastic material, such as polyvinyl chloride, and have thicknesses in the range of from about 4 mils to about 12 mils. In the quantity production system illustrated, said sheets with the pad bonded to their adjacent faces are fed over pressure rollers 24 to bond the sheet 12 to the strip 17 by means of the adhesive 18. The rollers 24 bring the superimposed laminae into intimate contact, with the softened adhesive 18 bonding sheet 12 to the metal strip and pad 14 bonding sheets 16 to sheet 12. After passing through the rollers 24, the laminate is cooled with water sprays 26 or any other suitable means, to set the bonds of the laminate, and the continuous laminated strip is cut into panels.

Figure 4:
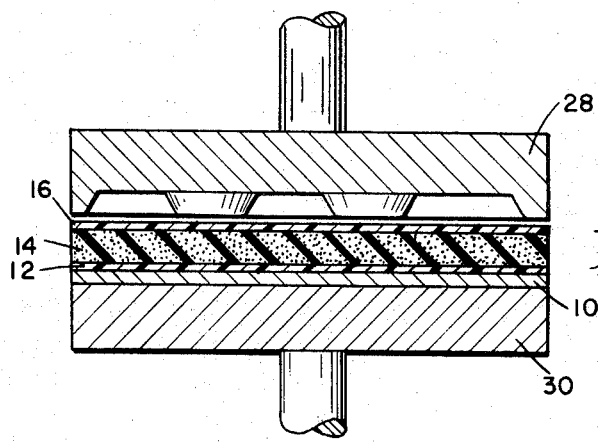
FIG. 4 is a sectional view showing apparatus which can be employed to fuse the laminae sheets together.

As shown in FIG. 4, the panels are placed between an embossing die 28 and backup plate 30, with sheet 16 presented toward the embossing die and metal panel 10 disposed against the backup plate 30. The die 28, which has a plurality of embossments in the desired pattern, is then brought toward plate 30 indenting the sheet 16 and compressing the pad 14 and sheet 16 against the lower sheet 12 to provide depressed portions 32 in the laminate. Said die exerts a pressure in the range of from about 500 p.s.i. to about 2000 p.s.i. and thus removes substantially all of the air spaces from the pad in the compressed portions 32. While the compression forces are being applied, the sheets 12 and 16 are heated to a temperature in the range of from about 300° F. to about 350° F. to thus fuse together the adjacent faces of said sheets. When the pad is formed from a thermosetting material, such as urethane, an open celled foam is used and the adjacent sheet faces will fuse together through the compressed open cells of the pad. When the pad is formed from a thermoplastic material, such as polyvinyl chloride, however, the pad can have a closed cell construction and the compressed portions of the pad will melt and fuse together the adjacent sheet faces. If the pad is formed from a thermosetting material impregnated with a thermoplastic material, the thermoplastic material will melt and fuse together the adjacent sheet faces so that a closed cell pad construction can be employed.

Said sheets and pad are compressed and heated for a period of from about 2 seconds to about 5 seconds so that the melting action permanently and rigidly fuses the sheets together within the extent of the portion 32. The die 28 and backup plate 30 are then separated to permit the fused portions of the sheets to cool and solidify into a thin substantially solid layer of adhesive material which bonds the sheet 16 to the desired pattern.

After such fusing, the laminate with its cushioned and non-cushioned portions can be worked or formed in any desired manner depending upon the end use of the article. In the illustrated article, the sheets, pad, and metal panel have openings 34 formed in the portions 32, but with the sheets 12 and 16 fused together and sheet 12 bonded to the panel 10 at said portions, the article will be substantially free from delamination over its entire extent, including the areas around said openings. Thus, the fusion of the sheets 12 and 16 through the compressed pad avoids the necessity of cutting the openings in the pad before lamination and the attendant maintenance of the proper alignment of said openings during lamination.

While the sheets and pad are illustrated in FIG. 3 as being applied to the metal strip in a three ply sandwich, it is to be understood, of course, that said sheets and pad can be applied singly to said metal strip or the sheet 12 can be applied to the metal and then the pad and sheet 16 applied to sheet 12 as a two ply sandwich. Further, the lower sheet 12 does not have to be in the form of a cast sheet, but can be an adhesive-like film of thermoplastic material applied to the panel 10, as a coating, and constituting an adhesive sheet bonding the pad to the panel.

It is to be understood, of course, that the panels need not be formed on a continuous basis as illustrated in FIG. 3, but can be precut and laminated as individual panels.

I claim:

1. A method of making a laminated padded article comprising the steps of bonding a first sheet of flexible thermoplastic material to a rigid metal panel, placing a foam elastomer pad over said first sheet, placing a second sheet of flexible thermoplastic material over said pad, compressing at least a portion of said pad and second sheet toward said first sheet under a compression force of from about 500 p.s.i. to about 2000 p.s.i., and heating said first and second sheets within the extent of said portion to a temperature in the range of from about 300° F. to about 350° F. and fusing their adjacent faces together through said pad while said pad and second sheet are being compressed toward said first sheet whereby the laminated article may be subsequently worked into the desired shape.

2. The invention as set forth in claim 1 in which said pad is formed from a thermoplastic material and said compressed portion of the pad is melted and fused to said first and second sheets during said heating step.

3. The invention as set forth in claim 1 in which said first and second sheets are heated for from 2 to 5 seconds during said heating step.

4. The invention as set forth in claim 1 in which said first sheet is applied to said panel as a coating of thermoplastic material.

References Cited

UNITED STATES PATENTS

| 2,434,527 | 1/1948 | Untiedt | 161—119 XR |
|---|---|---|---|
| 2,618,581 | 11/1952 | Lyijynen | 156—220 XR |
| 2,878,153 | 3/1959 | Hacklander | 161—120 XR |
| 2,955,972 | 10/1960 | Wintermute et al. | 156—79 |
| 3,256,131 | 6/1966 | Koch et al. | 161—124 XR |
| 3,244,571 | 4/1966 | Weisman | 161—124 XR |
| 3,360,415 | 12/1967 | Hellman et al. | 161—161 XR |
| 3,400,040 | 9/1968 | Osgood | 161—121 |

FOREIGN PATENTS 943,511  12/1963  Great Britain.

ROBERT F. BURNETT, Primary Examiner

W. A. POWELL, Assistant Examiner

U.S. Cl. X.R.

156—209, 250, 309, 313; 161—43, 44, 112, 119, 161